US007207855B2

(12) United States Patent
Rigby

(10) Patent No.: US 7,207,855 B2
(45) Date of Patent: Apr. 24, 2007

(54) JOINT

(75) Inventor: Gary Rigby, Unit 1, 6 Nicholl Street, Stroud, New South Wales 2425 (AU)

(73) Assignees: Gary Rigby, Stroud (AU); Neville Thomas Allsopp, Salamander Bay (AU); Robert Alexander Warren, Merewether (AU)

(*) Notice: Subject to any disclaimer, the term of this patent is extended or adjusted under 35 U.S.C. 154(b) by 27 days.

(21) Appl. No.: 10/966,899

(22) Filed: Oct. 15, 2004

(65) Prior Publication Data

US 2005/0106957 A1 May 19, 2005

(30) Foreign Application Priority Data

Oct. 16, 2003 (AU) .............................. 2003905694

(51) Int. Cl.
*B63H 23/34* (2006.01)
*F16D 3/00* (2006.01)

(52) U.S. Cl. ........................................ 440/83; 464/119
(58) Field of Classification Search ................. 440/83; 464/61.1
See application file for complete search history.

(56) References Cited

U.S. PATENT DOCUMENTS

| 2,274,154 | A | * | 2/1942 | Morgan et al. ................ 464/58 |
| 5,123,311 | A | * | 6/1992 | Dymek ....................... 81/177.6 |
| 5,290,182 | A | * | 3/1994 | Mondelop .................... 440/57 |

\* cited by examiner

*Primary Examiner*—Jesús D. Sotelo
(74) *Attorney, Agent, or Firm*—Michael Best & Friedrich LLP

(57) ABSTRACT

A joint for transmission of torque between an input element and an output element, the joint including a spring associated with the input and output elements and arranged in use to transfer torque between the elements, and a resiliently deformable member arranged to transmit thrust between the input and output elements.

13 Claims, 4 Drawing Sheets

JOINT

CROSS REFERENCE TO RELATED PATENT APPLICATIONS

This application claims the benefit of Australian Provisional Patent Application No. 2003905694, filed Oct. 16, 2003.

FIELD OF THE INVENTION

The present invention relates to apparatus which enables the transmission of torque over a coupling. In one form the invention relates to a drive joint which has application in marine apparatus.

BACKGROUND ART

Devices for transmitting torque from one rotating shaft to another are known in the art. Such devices utilise so-called Hooke universal joints or Rzeppa constant-velocity joints to join the rotatable shafts and find application in hand tools such as socket wrenches, shown for example in U.S. Pat. No. 6,390,927, U.S. Pat. No. 6,267,681 and U.S. Pat. No. 5,458,028. In such devices the coupling joint transfers torque between the shafts, although the performance of both constant velocity and universal joints can suffer if such devices were motorised for constant torque transmission, for example, instead of being merely hand-operated. Under such load conditions, severe strain can be placed on the joint and in particular on any joining pins. In the apparatus disclosed in these prior art documents, the spring portion of the joint is present for stiffening the joint assembly and for maintaining the shaft portions at a predetermined angle to each other.

As a further example of this, U.S. Pat. No. 3,122,901 describes a universal joint assembly which delivers power from a tractor to a farm implement. Multiple joints are arranged in series at predetermined angles and a non-rotatable external spring acts as a positioning element to restrain axial movement of the joints in order to maintain the relative axial position of each joint in the series. Torque is transmitted via the universal joints but only over a limited range of relative operating angles, as controlled by the spring, in order to avoid joint damage.

Some known devices for transmitting torque over a joint involve complex linkage arrangements which can be prohibitively costly, for example the use of back-to-back universal joints linked together and located in a housing such as shown in EP407630 in an inboard-outboard boat drive train. In U.S. Pat. No. 4,065,941 in a high impact wrench, torque is transmitted through a complicated ball joint arrangement. In this apparatus, the external spring portion is used for providing some flexibility and for returning the shafts into axial alignment after each use.

In U.S. Pat. No. 1,485,036 a joint is shown which includes an external spring which transmits the rotational torque of one rotating shaft to a second shaft. The proximate ends of each shaft adjoin a ball which functions to allow the shafts to become angularly displaced with respect to one another. This apparatus is suitable in situations where a positive thrust is applied from a first shaft to the ball and then to the second shaft. However, if one shaft should suddenly have a reverse thrust applied to it, for example when the motor drive attached to the first shaft reverses (eg. when a boat drive or tractor drive is reversed), or even if the spring should become stretched over time with use, the spring can stretch open sufficiently and the ball can become dislodged from its tensioned position between the two shafts during use, and may not necessarily be received back into that position, causing failure of the joint.

AU 2002300495 discloses a joint, particularly for use in a boat drive, for transmitting torque and thrust, including a helical spring for transmitting torque and a ball and socket joint for transmitting thrust.

SUMMARY OF THE INVENTION

In a first aspect the present invention provides a joint for transmission of torque between an input element and an output element, the joint comprising:
- a spring associated with the input and output elements and arranged in use to transfer torque between the elements; and
- a resiliently deformable member arranged to transmit thrust between the input and output elements.

In a particular embodiment, the joint couples the elements over a range of axial alignments. In situations where both positive and negative axial thrust is applied to either of the elements, and in situations where the spring becomes stretched with use over time, the coupling remains continuously engaged with each element, and the spring of the joint transfers torque between the elements.

In one form, the coupling enables relative pivoting between the input and output elements. In one form, the coupling is arranged in use for transmission of thrust between the elements. In a particular form, the joint is used to transmit torque from the input element to the output element and to transmit thrust from the output element to the input element. In this regard, typically the input element is rotatably driven by a drive, and typically the output element transmits this drive to a medium (e.g. a body of water, a road etc).

In one form, the resiliently deformable member is formed from an elastic material, such as rubber or an elastomeric material.

In one form, the spring is helical and the resiliently deformable member is located within the spring. In one form, the resiliently deformable member is generally cylindrical.

In one form, in an inactive position, the spring is held under tension and the resiliently deformable member is held under compression.

In one form, the spring is fixed to the input and output elements. In one form, each element has a perimeteral flange projecting out therefrom, each flange being welded to a respective adjacent end of the spring. In one form, each element is a shaft.

According to a second aspect, the present invention provides an inboard-outboard drive train for mounting on a boat, the drive train comprising:
- an input drive element having first and second ends, the first end being adapted for coupling to a drive in the boat;
- an output drive element having first and second ends, the second end being couplable to a propulsion element; and
- a flexible joint operative to transmit torque and thrust joining the input drive element second end to the output drive element first end.

In one form, the joint is in a form as described above.

In one form, the output drive element is disposed in a housing.

In one form, steering and trim control elements are mounted on the boat and operatively coupled to the housing.

In one form, the trim control element includes a hydraulic ram. In one form, the steering control element includes support means for supporting the joint for movement about an axis, wherein at least a portion of the support means is located at the axis. In one form, the support means supports the joint for movement about two substantially orthogonal axes.

In a particular form, the support means comprises:
a yoke being pivotably mounted on the boat; and
at least one arm having a first end pivotably coupled to the yoke and a second end coupled to the housing.

In one form, the input element is mounted at a thrust bearing disposed at a transom or keel of the boat.

According to a third aspect, the present invention further provides a boat including a bow section, a stern section, a drive, a propulsion element and the inboard-outboard drive train as defined above, the drive being mounted at the stern section of the boat, the first end of the input drive element being coupled to the drive, and the output drive element second end being coupled to the propulsion element.

BRIEF DESCRIPTION OF THE DRAWINGS

Notwithstanding any other forms which may fall within the scope of the present invention, embodiments of the invention will now be described, by way of example only, with reference to the accompanying drawings in which.

MODES FOR CARRYING OUT THE INVENTION

Figure 1:
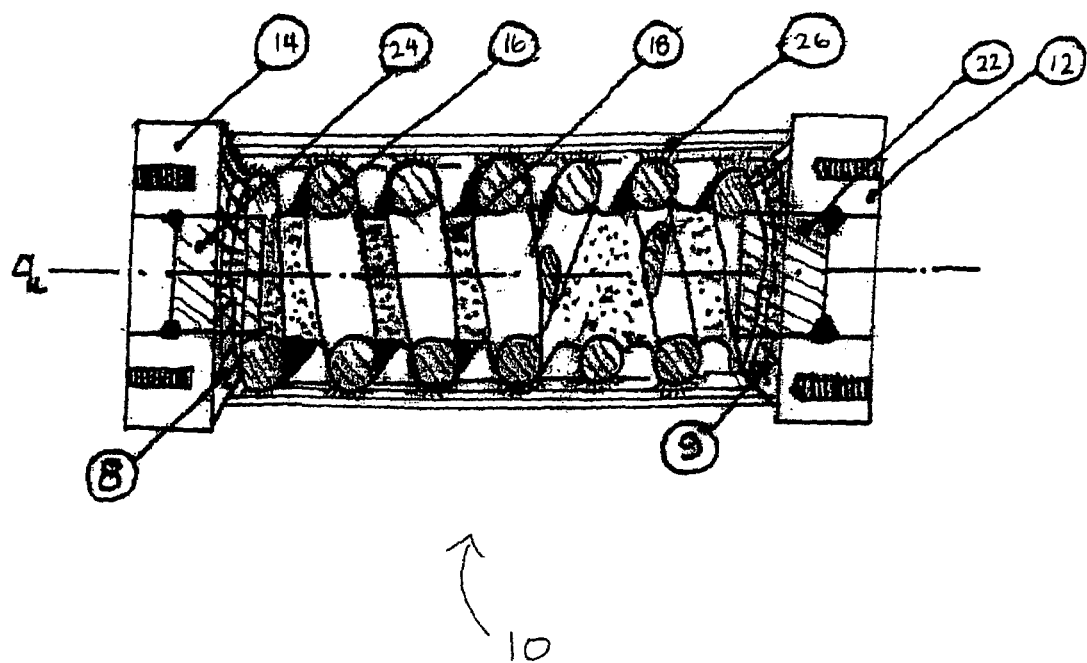
FIG. 1 shows a side part-sectional view of one embodiment of a joint for transmission of torque.
Figure 2:
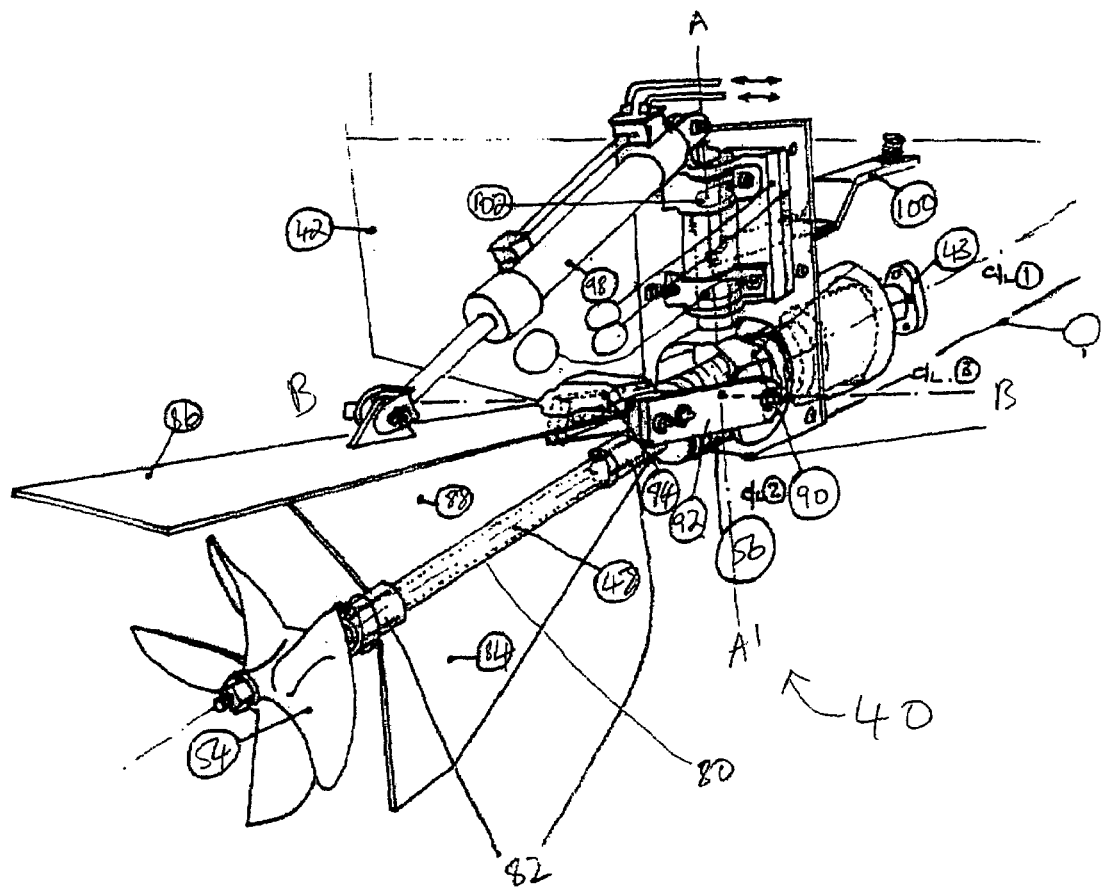
FIG. 2 shows a perspective view of one embodiment of an inboard-outboard boat drive when mounted on a boat.

Referring to FIGS. 1 and 2, a joint 10 is disclosed for transmission of torque between an input shaft of a drive, which is fixed to input flange 12 and an output shaft of a drive, which is fixed to output flange 14. The joint 10 includes a coil spring 16 for joining the input 12 and output 14 flanges, the spring 16 arranged in use to transfer torque from the input flange 12 to the output flange 14, for example if the input shaft is caused to rotate by being connected to a motor or other prime mover. The spring 16 is fixed to the input 12 and output 14 flanges by joining welds 8,9.

The joint 10 also includes a resiliently deformable member comprising a high density extruded rubber bar 18 inside the coil spring 16. The rubber bar 18 is arranged, in use, to transfer thrust (or axial force) from the output flange 14 to the input flange 12, for example if the output flange 14 is operatively connected to a source of some kind of frictional resistance, such as a propeller in water or air. As the thrust is transmitted from the output flange 14 to the input flange 12 via the rubber bar 18, the apparatus to which the input flange 12 is connected can be caused to move, for example through the air or across a body of water.

The resiliently deformable member 18 is maintained under compression by compression plugs 24, 26. The joint 10 is assembled by inserting the resiliently deformable member 18, which has a diameter when undeformed of equal to or slightly less than the internal diameter of the helical spring 16, into the centre of spring 16. The compression plugs 22, 24 are inserted at each end and are pressed inwards at a pressure of approximately 1000 psi thereby compressing the resiliently deformable member 18 in the axial direction. This causes the resiliently deformable member 18 to expand radially and mechanically bind to the internal surface of the windings of the spring 16. When the joint 10 is assembled and fixed to input and output shafts, such that the compression plugs 22, 24 maintain the resiliently deformable member 18 in compression, the spring 16 is maintained under tension, balancing the outwards axial force exerted by the compressed resiliently deformable member 18. A laminated vulcanised rubber external sleeve 26 covers the spring 16 and the weld 8, 9.

Figure 3:
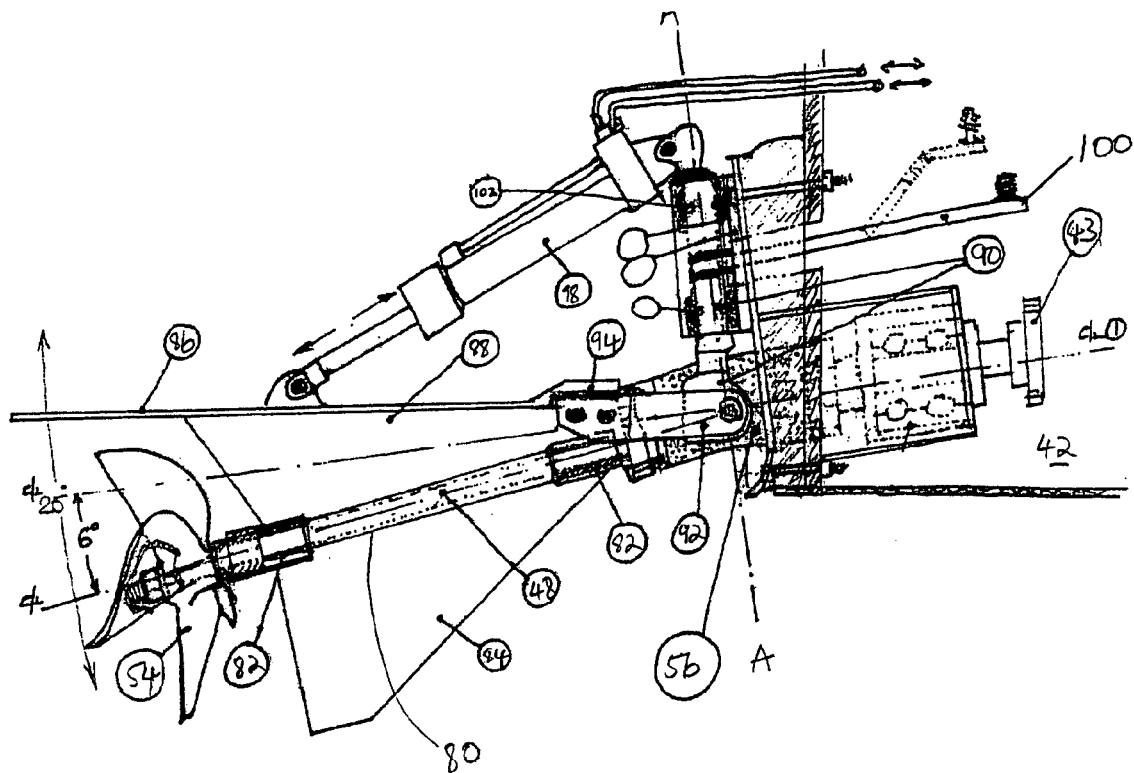
FIG. 3 shows a side view of the embodiment shown in FIG. 2.

Referring now to the drawings shown in FIGS. 2 and 3, an inboard-outboard drive train 40 is disclosed for mounting on a boat 42. The drive train includes an input drive shaft 43 having a first and a second end, the first end adapted to be coupled to a drive in the form of an engine mounted in the boat 42. The drive train 40 also includes an output drive shaft 48 having a first and a second end, the second end adapted to be coupled to a propulsion element in the form of marine propeller 54. The drive train 40 also includes a joint 56 for joining the input drive shaft second end to the output drive shaft first end, the joint 56 being a joint as shown in FIG. 1, including a coil spring 58 arranged in use to transfer torque from the input drive shaft 43 to the output drive shaft 48 and a resiliently deformable member arranged in use to transfer thrust from the output drive shaft 48 to the input drive shaft 43.

The output drive shaft 48 is disposed in a cylindrical housing 80 and centred in that housing by water lubricated bearings 82. The housing 80 has a rudder fin 84 fitted on its lower side to facilitate steering of the boat 42. A cavitation plate 86 is located on an upper side of the housing 80 and is joined to the housing by a web 88. Steering (left to right positioning of the drive train 40) and trim control (up or down positioning of the drive train 40) devices form part of the drive train 40 and are mounted on the boat 42 and operatively coupled to the housing 80.

Figure 4:
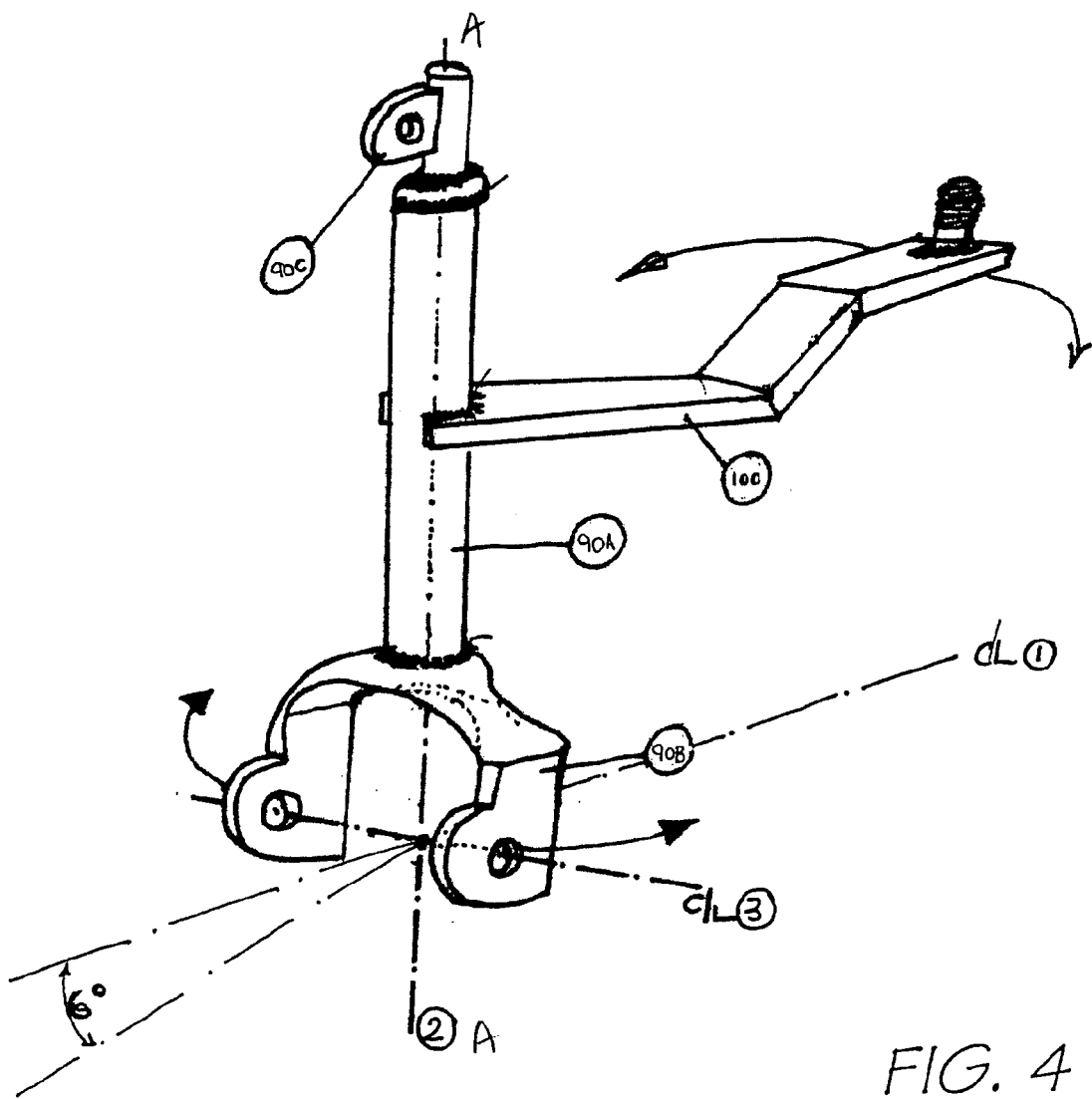
FIG. 4 shows a perspective view of one embodiment of a component of a steering element for use in a boat drive.

The steering device includes a yoke 90, a pair of arms 92 and a saddle 94. As shown in more detail in FIG. 4, the yoke 90 includes an arm portion 90A, a yoke portion 90B and a flange 90C. The arm portion 90A is mounted on the boat 42 by mounting bushes 102, for rotation about an axis A—A The tiller arm 100 is welded to the arm portion 90A. The yoke portion 90B extends around the joint 56. The pair of arms 92 each have a first end pivotally coupled to the yoke portion 90B, for pivoting about a second axis B—B, the second axis being substantially orthogonal to axis A—A, and extend generally axially along each side of the joint 56. The second end of each arm 92 is fixed to the saddle 94 which is welded to the cavitation plate 86.

Trim tilt control is effected by remote actuation of a hydraulic ram 98 operatively positioned between and pivotally linked to both the flange 90C and the upper surface of the cavitation plate 86. Actuation of the hydraulic ram 98 causes the arms 92 to pivot about axis B—B, thus deflecting the drive train 40 up and down.

Steering control is effected by rotation of the tiller arm 100 to cause the yoke 90 to pivot about the support bushes 102 on axis A—A. The arms 92 provide rigid support for the joint 56, and deflect the drive train 40 from side to side.

As the joint 56 is flexible, the yoke 90 and arms 92 together provide support to positively locate the rotation axes A—A and B—B.

In further embodiments of the drive train, the cavitation plate, web and fin can be of different shapes to those shown in the drawings and the propeller need not be of the marine variety as shown but another suitable type of propeller depending on the fluid conditions and boating requirements. Other arrangements of trim pivoting mechanisms are envisaged which may be of a different arrangement to the pivotable hydraulic ram 98 coupled to yoke 90 and cavitation plate 86 shown. For example, in the absence of a cavitation plate, an hydraulic ram can also be positioned directly between the shaft housing 80 with the opposing end of the ram joined to a slidable member which can move in a slot projecting from the boat transom ultimately linked to the boat tiller arm. The functionality of a flexible coupling and coil spring in a joint which allows trim and steering movement of the drive train as well as the transmission of torque and thrust remains a common element of all such alternative arrangements. In still further embodiments of the drive the coil spring can be of any appropriate profile depending upon the selected torque (revolutions per unit time) required for the particular application.

In use the joint in the drive train is able to transmit a substantial axial force or thrust in conjunction with the ability to transfer large amounts of torque. A Hooke type universal joint in such an application would experience more variable angular velocity and attendant vibration and a Rzeppa constant-velocity type joint would be unable to transmit an axial force. The present joint, unlike a Rzeppa joint, is immune to the effects of vibration in the driven shaft. The drive joint is simple to manufacture with few moving parts and is therefore simpler to maintain. Because of its simplicity, the drive train can also be of significantly less weight than conventional boat drive trains which can be of importance in racing boats, for example.

In use the flexible nature of the coil spring allows the input shaft and the output shaft to be displaced such that the angle between them can be of the order of 45 degrees and still allow full transmission of torque and axial force (thrust). This gives the drive train the flexibility of being used in either hard water (fully submerged in water), semi-surfacing or surface piercing applications depending upon the selected trim angle. Present boat drive train apparatus usually only allows a drive to be used in one or other of these situations, for example EP407630 (SAND) is designed to operate in hard water whereas U.S. Pat. No. 4,976,638 (GRINDE) is designed to operate in a surface piercing application.

It is to be understood that, if any prior art information is referred to herein, such reference does not constitute an admission that the information forms a part of the common general knowledge in the art, in Australia or any other country.

In the claims which follow and in the preceding description of the invention, except where the context requires otherwise due to express language or necessary implication, the word "comprise" or variations such as "comprises" or "comprising" is used in inclusive sense, ie to specify the presence of the stated features but not to preclude the presence or addition of further features in various embodiments of the invention.

Whilst the invention has been described with reference to preferred embodiments it should be appreciated that the invention can be embodied in many other forms.

The invention claimed is:

1. An inboard-outboard drive train for mounting on a boat, the drive train comprising:
   an input drive element having first and second ends, the first end being adapted for coupling to a drive in the boat;
   an output drive element disposed in a housing and having first and second ends, the second end being arranged to be coupled to a propulsion element;
   a joint joining the input drive element second end to the output drive element first end, the joint being able to transmit torque and thrust between the ends and allowing relative pivoting between the input and output elements; and
   steering and trim control elements including a yoke extending about the joint and at least one arm having a first end coupled to the yoke and a second end coupled to the housing, the yoke and arm supporting the joint for movement about first and second substantially orthogonal axes with the yoke being arranged to be pivotably mounted on the boat so as to be able to pivot about the first axis and the first end of the at least one arm being pivotably mounted to the yoke to be able to pivot about the second axis.

2. An inboard-outboard boat drive as claimed in claim 1, further comprising a hydraulic ram extending between the yoke and the output drive element housing, wherein trim tilt control is effected by actuation of the hydraulic ram which causes rotation of the joint about the second axis.

3. An inboard-outboard boat drive as claimed in claim 1, wherein steering control is effected by rotation of the yoke about the first axis.

4. An inboard-outboard boat drive as claimed in claim 1, wherein the input element is mounted at a thrust bearing disposed at a transom or keel of the boat.

5. An inboard-outboard drive according to claim 1, wherein the joint comprising:
   a spring associated with the input and output drive element ends and arranged in use to transfer torque between the elements; and
   a resiliently deformable member arranged to transmit thrust between the input and output drive elements.

6. An inboard-outboard drive as claimed in claim 5, wherein the joint is used to transmit torque from the input drive element to the output drive element and to transmit thrust from the output drive element to the input drive element.

7. An inboard-outboard drive as claimed in claim 5, wherein the resiliently deformable member is formed from rubber or an elastomeric material.

8. An inboard-outboard drive as claimed in claim 5, wherein the spring is helical and the resiliently deformable member is located within the spring.

9. An inboard-outboard drive claimed in claim 8, wherein the resiliently deformable member is generally cylindrical.

10. An inboard-outboard drive as claimed in claim 5, wherein, in an inactive position, the spring is held under tension and the resiliently deformable member is held under compression.

11. An inboard-outboard drive as claimed in claim 5, wherein the spring is fixed to the ends of the input and output drive elements.

12. An inboard-outboard drive as claimed in claim 11, wherein each clement has a perimeteral flange projecting out therefrom, each flange being welded to a respective adjacent end of the spring.

13. A boat including a bow section, a stern section, a drive, a propulsion element and the inboard-outboard drive train of claim 1, the drive being mounted at the stern section of the boat, the first end of the input drive element being coupled to the drive, and the output drive element second end being coupled to the propulsion element.

\* \* \* \* \*